United States Patent Office

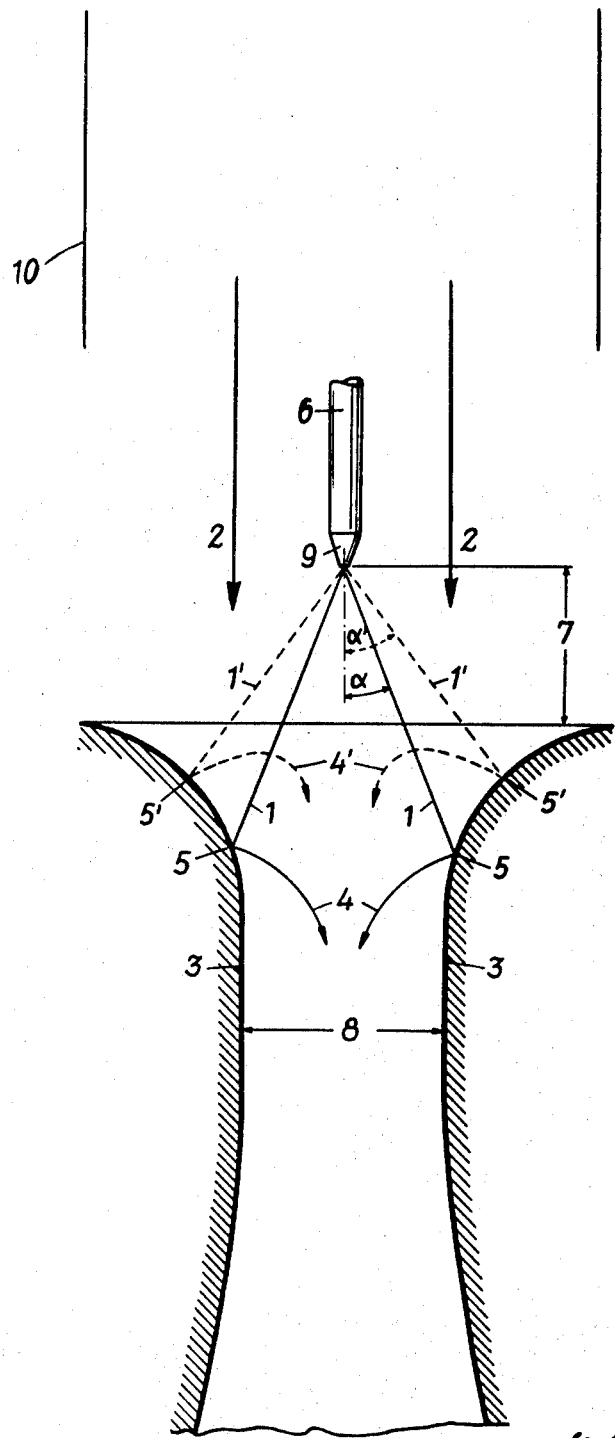

3,386,712
Patented June 4, 1968

3,386,712
PROCESS FOR INTIMATELY CONTACTING
TWO FLUIDS
Gerhard Pafla, Vienna, Austria, assignor to
Waagner-Biro A.G., Vienna, Austria
Continuation of application Ser. No. 255,425, Jan. 28,
1963. This application Apr. 26, 1966, Ser. No. 545,376
4 Claims. (Cl. 261—116)

This application is a continuation of my application Ser. No. 255,425 filed Jan. 28, 1963, now abandoned.

The present invention relates to a process for intimately contacting two moving fluid media.

An important object of the invention is to provide a process for repeatedly and intimately contacting each zone of one moving fluid medium with another moving fluid medium.

Another object of the invention is to provide a process for purifying or washing one moving fluid medium by means of another moving fluid medium.

A further object of the instant invention is to provide a process for removing impurities from a moving gas by repeated and intimate contact with a finely distributed liquid substance.

An additional object of the invention is to provide a process for removing finely distributed impurities from rapidly moving gaseous media by means of a moving dispersed liquid stream.

With the above objects in view, one feature of the invention resides in the provision of a process which comprises the steps of advancing a first fluid medium in an at least partially restricted path, introducing into the path a second fluid medium in finely dispersed condition and at an angle to the direction in which the first fluid medium advances, and causing the second fluid medium to rebound on the path defining means in such a manner as to again intimately contact the first medium by moving at an angle different from the angle of initial contact and in a direction inclined with respect or opposed to that in which the first fluid medium advances. It is preferred to introduce the second fluid medium into the path of the first fluid in the form of a fine spray or veil having the shape of an annular curtain or another circumferentially complete hollow body, such as the mantle of a cone, and to cause the finely dispersed second fluid medium to rebound on the surfaces of a restricting tube, plate or the like through or along which the first fluid is led. The second fluid medium may rebound at such an angle as to have a component in the direction counter to the flow of first fluid, to have a component coinciding with the direction in which the first fluid flows, to advance at right angles to the flow of first fluid, or to advance counter to the flow of the first fluid. It is equally possible to cause the second fluid medium to rebound more than once upon the surfaces of the flow restricting means for the first fluid, whereby each zone of the latter is repeatedly moved into intimate contact with and subjected to the action of the second fluid medium. For example, the first fluid may be crude gas containing finely distributed solid or liquid impurities, and the second or treating fluid medium may be water or another liquid substance, i.e., the novel process is suitable for washing or otherwise treating gases with water or the like.

The novel apparatus comprises means for advancing a first fluid into a flow restricting or confining body, such as a Venturi tube or the like, and means, preferably concentric with and located at the upstream side of the flow restricting body, for discharging at least one curtain or veil of finely dispersed second fluid into and at an angle to the direction of flow of the first fluid toward and into contact with the surfaces of the flow restricting body, whereby the finely dispersed second fluid rebounds at least once on the flow restricting and path forming means and again penetrates into the stream of first fluid.

The novel features which are considered as characteristic of the invention are set forth in particular in the appended claims. The invention itself, however, both as to its construction and its method of operation, together with additional objects and advantages thereof, will be best understood from the following detailed description of the accompanying drawing the single illustration of which shows schematically a specific form of the apparatus for the practice of my process.

Referring now in greater detail to the drawing, the first fluid, e.g., a crude gas containing finely dispersed solid and/or liquid impurities, is advanced at a high rate of speed, e.g., by blower means 10, in the direction of arrows 2 to enter into a flow-restricting and path-defining body here shown as a Venturi tube 3. A cleaning fluid, e.g., water, is introduced into the tube 3 through the nozzle 9 of a concentric tubular body or pipe 6. As shown, the construction of the nozzle 9 is such that the second fluid is discharged in the form of a fine curtain or weil 1 having the shape of a hollow cone inclined through an angle $\alpha$ with respect to the direction in which the first fluid advances (arrows 2). This angle $\alpha$ may vary and depends upon the specific configuration of the nozzle 9. The curtain 1 comes into contact with the inner surface of tube 3 at points indicated by numerals 5 and rebounds to form a second curtain 4 which latter, too, defines an angle with the direction in which the first fluid advances. Thus, each zone of the fluid medium advancing in the direction of arrows 2 first traverses and is intimately contacted by the curtain 1 of a second fluid medium discharged by the nozzle 9, and thereupon passes through the second curtain 4 on its way through the path-forming and flow-restricting body 3. In this manner, any impurities entrained by the first fluid advancing in the direction of arrows 2 are completely removed upon repeated intimate contact with, say, a liquid substance discharged by the nozzle 9 of pipe 6.

It will be noted that the fluid curtain 4 has a component in the direction of arrows 2 (of slower speed than said high rate of speed), i.e., that the second fluid discharged by the nozzle 9 makes two acute angles with the direction in which the first fluid advances, the first acute angle being the angle $\alpha$ between the curtain 1 and the line parallel with arrows 2, and the second acute angle being that between the curtain 4 and the arrows 2.

As shown in broken lines, the nozzle 9 may discharge the second fluid medium at a larger angle $\alpha'$ to form a curtain 1' which rebounds on the inner surface of the Venturi tube 3 at points indicated by numerals 5' to form a second curtain 4' having a component in the direction counter to that of arrows 2. Such arrangement is very desirable in certain gas washing processes as it contributes to better separation of impurities entrained by the first fluid.

By suitably selecting the configuration of the nozzle 9, the curtain of the second fluid discharged from the pipe 6 may rebound at right angles to the direction of arrows 2, and it is equally possible to discharge the second fluid at such a speed and at such an angle that the second curtain or veil 4 or 4' again rebounds on the inner surface of Venturi tube 3, whereby each zone of the first fluid is caused to pass through three differently inclined curtains formed by finely dispersed second fluid medium. As a further alternative, the second fluid may be caused to rebound in a direction exactly or nearly counter to that in which the first fluid advances.

It has been found that a very advantageous contact between the two fluid media may be brought about if the proportion between the shortest distance 7 of the nozzle 9 from the intake end of tube 3 and the diameter 8 of the narrowest or neck zone in the tubular body 3 is between about 0.5 and 1.1.

It will be readily understood that the novel process is in no way limited to the use of a Venturi tube, but that it may be practiced in an apparatus in which the normally undirectionally advancing first fluid is bounded by several non-connected plano or arcuate surfaces. In addition, the second fluid may be introduced into the moving first fluid through more than a single discharge nozzle; thus, a single multi-stage nozzle or a system of two or more independent nozzles may replace the member 9 to produce a series of curtains 1 or 1' each of which will rebound on the path-forming body 3 and, consequently, each zone of the first fluid will be caused to pass through a greatly increased number of curtains formed by the dispersed second fluid.

Still further, the curtains 1, 1', 4 and 4' need not necessarily assume the shape of rotary bodies, i.e., these curtains need not form a series of circumferentially complete fluid layers, but may be of any plano or arcuate form. It will be readily understood that a certain quantity of second fluid medium may be discharged by the nozzle 9 into the center of the hollow cone-shaped curtain i.e., that a comparatively dense unitary or composite stream of second fluid medium may advance through or near to the center of the Venturi tube 3.

As an additional alternative, the second fluid medium may be discharged into the stream of the first fluid advancing in the direction of arrows 2 from one or more points external to the stream, i.e., the points at which the second fluid medium is discharged toward and into the first fluid may surround the stream of first fluid.

As before stated, the first fluid may be a contaminated gaseous medium, such as a crude gas, and the second fluid may be a liquid substance, such as water, which latter removes and carries away the impurities upon repeated intimate contact with the gaseous substance.

What is claimed as new and desired to be secured by Letters Patent is:

1. A process for removing finely distributed solid particles from a gas stream, comprising the steps of moving a gas stream containing small solid particles at a high rate of speed through a Venturi tube substantially in direction of the axis thereof; and projecting liquid particles at a lower rate of speed along a first hollow conical path having an axis coaxial with said axis of said Venturi tube onto the annular inlet zone thereof so that said liquid particles projected along said hollow conical liquid path form a first curtain of liquid particles inclined to the path of said solid particles-containing gas stream, rebounding the thus-projected liquid particles then from said annular inlet zone of said Venturi tube along a second transverse path substantially into the neck zone of said Venturi tube and forming a second curtain of liquid particles extending transversely to the path of said solid particles-containing gas stream, whereby said solid particles-containing gas stream moving at a high rate of speed first intersects and collides with said first curtain of said slower moving liquid particles and thereafter intersects and collides with said second curtain of said slower moving liquid particles so that said solid particles in said gas stream moving at a high rate of speed are absorbed and removed from the gas stream by said slower moving liquid particles.

2. A process as defined in claim 1, wherein said first hollow conical path of said liquid particles defines an acute angle with the direction of movement of said gas stream through said Venturi tube, and wherein said liquid particles which are projected along said first hollow conical path and which rebound along said second transversal path move in said second path at a second angle with reference to the direction of movement of said gas stream.

3. A process as defined in claim 1, wherein said gas stream is moved toward said Venturi tube substantially coaxially with said axis of the latter.

4. A process as defined in claim 3, wherein said liquid particles are projected from a point located in advance and on the axis of said Venturi tube, and wherein said gas stream is moved toward said Venturi tube at least from said point, whereby said gas stream substantially uniformly intersects said first hollow conical liquid path.

References Cited

UNITED STATES PATENTS

| | | | |
|---|---|---|---|
| 648,411 | 5/1900 | Jaennigen | 261—115 |
| 671,176 | 4/1901 | Bangs | 261—118 X |
| 1,894,696 | 1/1933 | Lindemann | 261—116 |
| 2,029,331 | 2/1936 | Parker | 216—76 X |
| 2,032,404 | 3/1936 | Fisher | 261—116 |
| 2,217,841 | 10/1940 | Holinger | 261—118 X |
| 2,447,123 | 8/1948 | Jones | 261—116 |
| 2,484,277 | 10/1949 | Fisher | 261—116 X |
| 3,275,063 | 9/1966 | Tailor | 261—118 |

HARRY B. THORNTON, *Primary Examiner.*

E. H. RENNER, *Assistant Examiner.*